April 21, 1959     M. O. SCHUR     2,882,970
LAMINATED FILTER TIP

Filed April 18, 1956     4 Sheets-Sheet 1

INVENTOR
Milton O. Schur
BY
ATTORNEYS

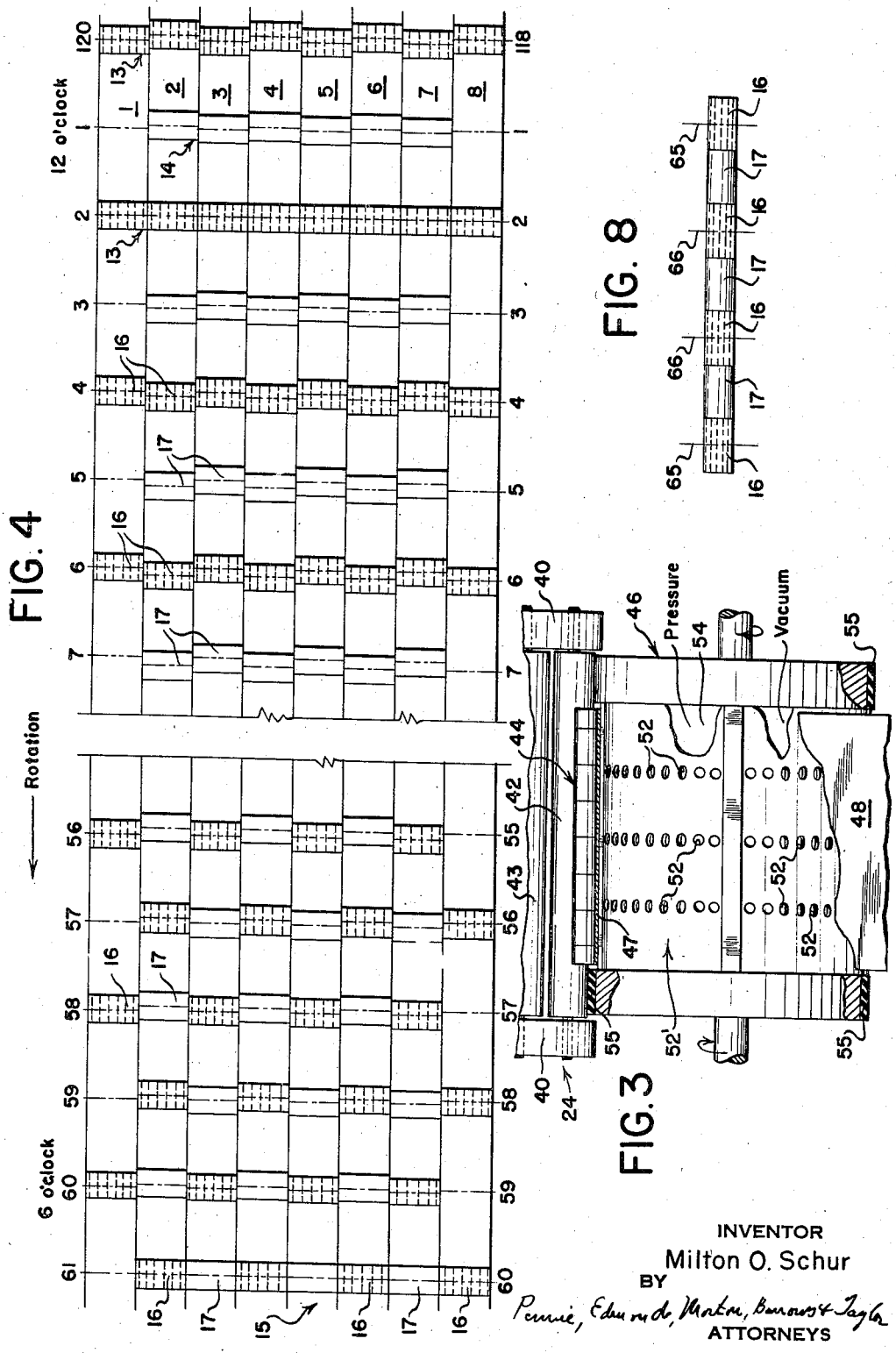

April 21, 1959 M. O. SCHUR 2,882,970
LAMINATED FILTER TIP
Filed April 18, 1956 4 Sheets-Sheet 4

INVENTOR
Milton O. Schur
BY
Pennie, Edmonds, Morton, Barrows & Taylor
ATTORNEYS

United States Patent Office 2,882,970
Patented Apr. 21, 1959

2,882,970

LAMINATED FILTER TIP

Milton O. Schur, Asheville, N.C., assignor to Olin Mathieson Chemical Corporation, Pisgah Forest, N.C., a corporation of Virginia Application April 18, 1956, Serial No. 578,989

23 Claims. (Cl. 164—61)

This invention relates to the manufacture of filter tips for cigarettes and more particularly to a method of and apparatus for making laminated filter tips.

By "laminated filter tips" I mean filter tips divided into two or more sections longitudinally in which the section at the end that is placed in the smoker's mouth, or outer end, may merely be a paper tube or cylinder of sufficient strength to withstand handling or cutting, or it may be a filter of any type such as a tube containing cellulose sheet material arranged in the tube to form a plurality of generally longitudinal, tortuous passages. The other, or inner, section of the filter tip that is between this outer section and the end of the cigarette proper may consist of any other type of filter, such as a tube containing paper or other sheet cellulose material arranged in the tube to form a plurality of generally longitudinally tortuous passages, with an adsorbent, such as activated charcoal, arranged on the sheets, or it may be any other form of filter section differing in some respect from the first, or outer, section of the filter.

The present invention is thus directed to the process of and apparatus for assembling filter rods in alternate arrangement whereby each filter formed from said rods will consist of two sections aligned end to end to produce a filter having a mouth-piece, or outer section, to be received in the mouth, and an inner section of a different construction than the outer section.

In carrying out the invention, I first form rods of multiples of each of the sections, and deliver these rods to a series of traveling rolls or belts, in alternate arrangement. These rolls or belts are provided with carriers or saddles in which the rods rest. They may consist of blocks having U-shaped transverse grooves which receive the rods. As the rods travel along the rolls, or belts, they pass a series of cutters and are cut into sections of the proper length. The rolls or belts are so spaced that each section formed in the cutting operation is equal in length to the length of a filter tip, approximately 15 mm. The rolls or belts travel in parallel paths in two sets in one example of procedure. Alternate rolls or belts, such as the first, third, fifth and seventh rolls or belts of a series of eight rolls or belts travel at one speed, and the second, fourth, sixth and eighth rolls or belts at a higher speed. The difference in the speed of travel of the two sets of carriers is such that the faster rolls or belts advance the distance between two sets of carriers during the operative flight, thus aligning the segments in alternate sequence at the discharge end of the machine.

Thus, in the example given, one of the two disparate forms of filter rods is fed to the rolls or belts in a rod of a length equal to that of eight section lengths and alternately a rod of the other type of a length equal to that of six section lengths is fed to the rolls or belts. The sets of saddles or carriers are spaced a predetermined distance from each other on the rolls or belts to bring a series of saddles on one group of alternate rolls or belts traveling at the higher speed into alignment with the preceding group of saddles on the alternate, slower traveling rolls or belts at the discharge end of the machine. Just beyond the feed point, before the different speeds of the rolls or belts have had a tendency to displace the rods from some of the saddles by more than a few percent, the rods are cut into filter sections. Thus when the first set of saddles reaches the outlet end, rolls or belts 2, 4, 6 and 8 carrying one type of filter sections will have moved ahead of rolls or belts 1, 3, 5 and 7, but the second set of saddles on rolls or belts 2, 4, 6 and 8 will have moved into transverse alignment with the first set of saddles on rolls or belts 1, 3, 5 and 7, thus giving an alternate arrangement of seven filter sections. Likewise the filter sections of the second type on the slower moving rolls or belts 1, 3, 5 and 7 in the second set of saddles will be overtaken by filter sections of the first type in the third set of saddles to transversely align seven filter sections with the two types alternately arranged. This continues with the saddles of a series on the slower moving rolls or belts being overtaken in each instance by the next row of saddles on the faster moving rolls or belts.

In an alternative form of the invention, I feed one type of rods to a series of belts at one position and a second type of rods to a second series of belts at a second position. The first set of belts may consist, for instance, of seven belts and the rods may be equal in length to four sections. The rods so delivered are cut and the sections are then moved laterally by suitable guides into the carriers or saddles of the first, third, fifth and seventh belts and are conveyed in these saddles to the outlet end of the machine. The second, fourth, and sixth belts do not travel to the outlet end of the machine, but pass over sprockets and start their return flight at an intermediate point.

The second set of belts, which begin their operative flight at a different point, may consist of five belts with the first, third and fifth belts of this set in the same vertical planes as the second, fourth and sixth belts of the first set. The rods delivered to these belts consist of three sections. After being cut, the sections are moved by suitable guides into the saddles of the first, third and fifth belts. Of this series, the second and fourth belts do not travel to the outlet end of the machine but pass over sprockets at an intermediate point and return to the beginning of the operative flight. The first, third and fifth belts of this set being arranged in the plane of the second, fourth and sixth belts of the first set, travel to the discharge end of the machine. The two series of belts are timed so that the sets of saddles reach the discharge end in alignment, and thus deliver alternate sections of filter tips.

The discharged alternate sections of filter tips are wrapped and cut to proper length by conventional type of apparatus. While such apparatus forms no part of the present invention, it is illustrated and described herein for the purpose of disclosing a complete, operative machine.

In the drawings:

Fig. 3 is a detailed view illustrating how the rollers of the wrapping machine are intermittently driven from the ledger roll;

Fig. 4 is a diagrammatic layout, in plan view, of the travel of the rolls, showing how the saddles of one set of rolls overtake the next preceding set of saddles of the slower moving set of rolls between the inlet and discharge;

Fig. 8 is a view of the finished multiple filter plug.

Figure 1:
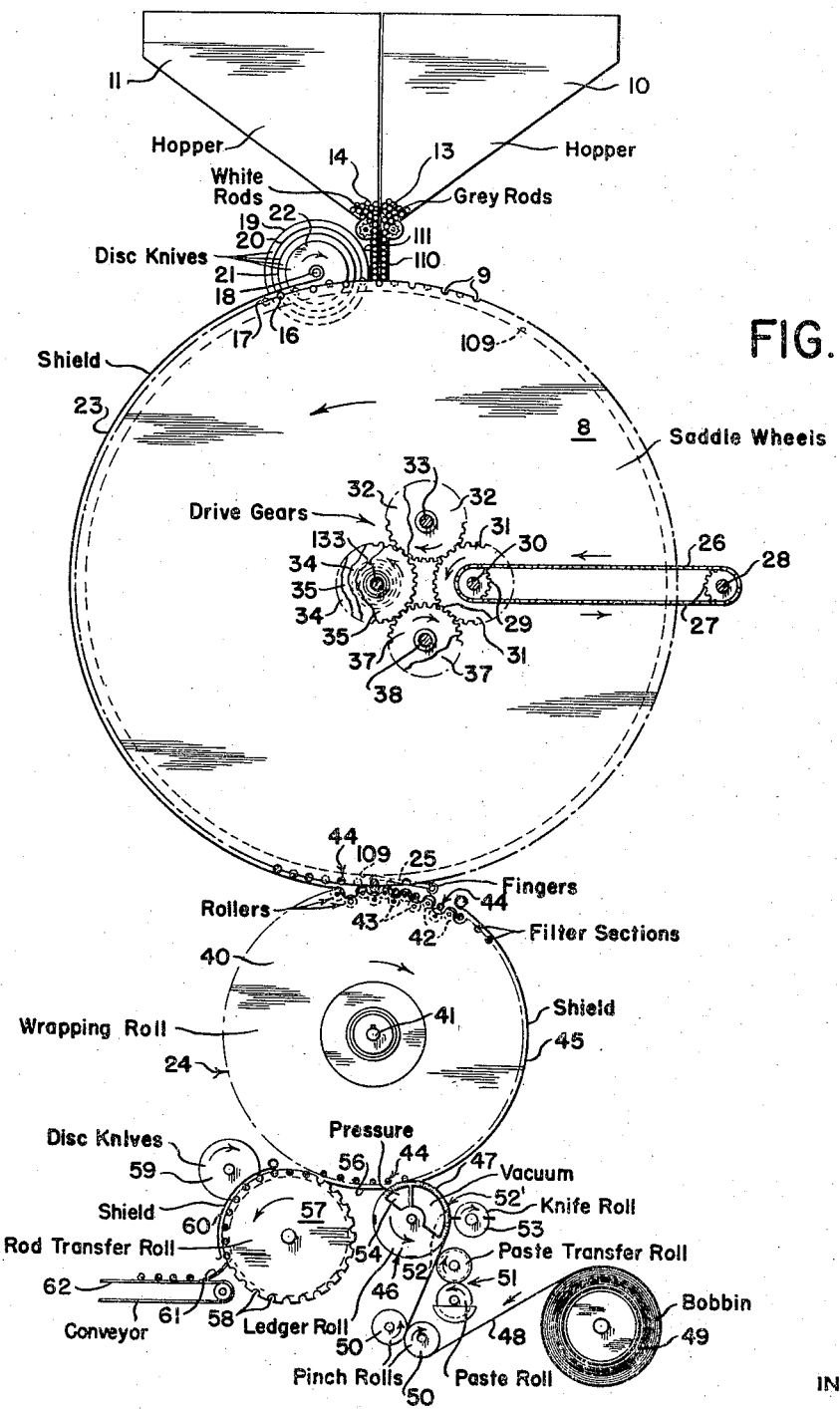
Fig. 1 is a diagrammatic, side elevation of a set of rolls by means of which the filter sections are alternately arranged, shown in cooperation with a conventional wrapping machine.
Figure 2:
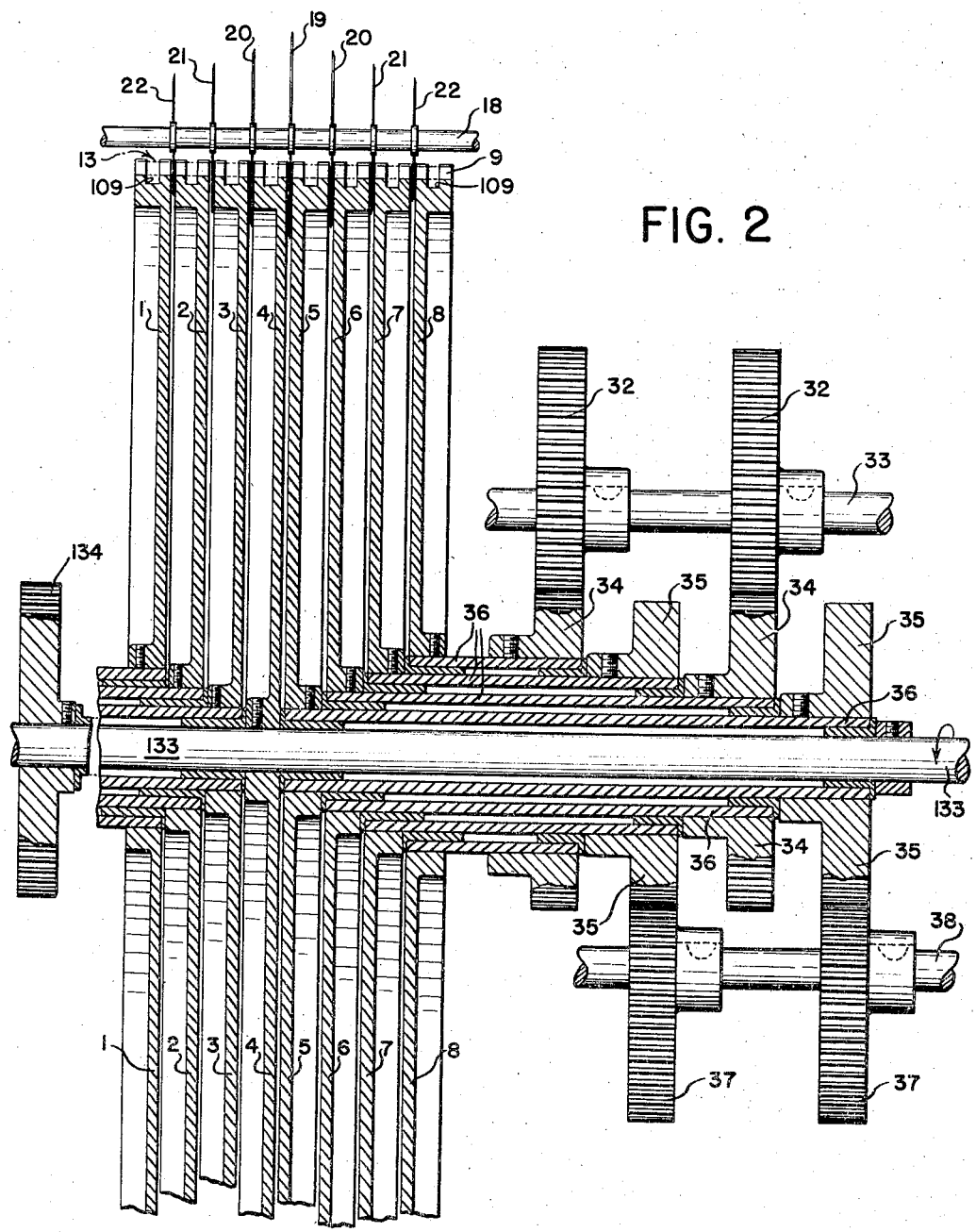
Fig. 2 is a vertical, sectional view of a portion of the rolls illustrating one method of driving the alternate rolls at different speeds.

Referring to Figs. 1 to 4 of the drawings, the mechanism for delivering alternately arranged filter sections to a wrapper machine may consist of a series of rolls, herein illustrated as eight rolls, designated 1 to 8, respectively. These rolls are divided into two sets of rolls 1, 3, 5 and 7 rotating at one speed, and rolls 2, 4, 6 and 8 at a different speed. The peripheries of the rollers are provided with saddles 9 for the reception of the filter rods. These saddles may consist of substantially semi-circular grooves of slightly greater size than the diameter of the rods. As shown in Fig. 1, the rolls are each provided with a plurality of these saddles, equally spaced from each other, about the peripheries of the rolls.

The rods are delivered to the saddles from hoppers 10 and 11 mounted over the rolls. Suitable control means are provided to feed the rods alternately to a set of aligned saddles, first from hopper 10 and then from hopper 11. The rolls rotate in a counter-clockwise direction as the machine is viewed in Fig. 1. The manner in which the saddles of the various rolls align at the inlet beneath the hoppers 10 and 11, and the saddles of alternate rolls overtake the next preceding saddles of the other set of rolls at the time they reach the outlet at the bottom is illustrated in Fig. 4. The faster traveling rolls 2, 4 and 6 are each provided with 118 saddles and the slower traveling rolls 3, 5 and 7 are each provided with 120 saddles. Alternate saddles are omitted on the outer rolls 1 and 8 for a purpose to be hereinafter described. Thus, the roll 1 has 60 saddles and the roll 8 has 59. The rolls are driven at such speeds that from the position designated as 12 o'clock in Fig. 4, which represents the top where the rods are delivered from the hoppers 10 and 11 to the bottom or discharge position, designated as 6 o'clock in Fig. 4, that each set of saddles of rolls 2, 4, 6 and 8 overtake the preceding set of saddles on rolls 1, 3, 5 and 7.

The position 1 of Fig. 4 corresponds to 12 o'clock on the rolls of Fig. 1. The filter rods from hopper 10 are delivered to the saddles just before they reach position 1 of Fig. 4, and the rods from hopper 11 are delivered to the saddles just after they pass position 1 of Fig. 4. At the time of delivery of the rods from hopper 10, saddles on the outer rolls 1 and 8 are in alignment with a set of saddles on the remaining rolls 2 to 7. At the time of delivery of the rods from hopper 11, the portions of rolls 1 and 8 which have not been recessed to form saddles, are in alignment with a row of saddles on the remaining rolls 2 to 7. At either of these positions, the misalignment of the saddles is small enough to permit the rods to enter the saddles. In the drawings I have designated the rods 13 which form the inner sections of the filter tips as grey rods and the rods 14 which form the outer sections as white rods. The words "grey" and "white" have no significance except to indicate the rods from which the inner and outer sections of a laminated filter tip are formed. As shown in the alternate sets of saddles of Fig. 4, the grey rods 13 are of a length equal to 8 filter tips or 120 mm. and the white rods 14 are 90 mm. long, equal in length to 6 filter tips. The rods 14 are placed in saddles of rolls 2 to 7, inclusive.

Elimination of alternate saddles on rolls 1 and 8 provides a very simple means for feeding the rods from the hoppers 10 and 11 to the rolls. As shown, the hoppers are provided with inclined bottoms which deliver the rods to chutes 110 and 111 in vertical arrangement, one above the other. The lower ends of these chutes are arranged close to the surface of the rolls, being spaced from the rolls a distance considerably less than the diameter of the rods. When a row of saddles in which the outer saddles of rolls 1 and 8 are omitted pass under chute 110, the 8 section length rod 13 is prevented from being delivered by the surfaces of rolls 1 and 8, but a six section rod 14 will be delivered to this row of saddles from chute 111. When a row of 8 saddles passes under chute 110, an 8 section rod 13 will be delivered to the saddles. The rod in these saddles will prevent a six section rod 14 from being delivered from the chute 111 as the row of saddles passes under it.

It will be noted in Fig. 4 that as the wheels rotate the saddles of the faster moving wheels 2, 4, 6 and 8 move ahead of the saddles of rolls 1, 3, 5 and 7 with which they were aligned at the inlet and come in alignment with the preceding row of saddles at the outlet end of the machine, as indicated at 15.

Shortly after the rods 13 and 14 are placed in a row of saddles, they are cut into individual filter tip sections 16 and 17. As shown, a shaft 18 carries a series of knives consisting of a central knife 19, a pair of knives 20 on each side of the central knife of slightly smaller diameter, and two other pairs 21 and 22 of knives, each of smaller diameter than the preceding pair, and all spaced from each other an equal distance, a distance equal to the length of the filter tip sections 16 and 17. The knives are placed near the inlet, because as the rolls move from the inlet position, the saddles which were in alignment begin to move out of alignment, as indicated, for instance, at positions 3 and 4 of Fig. 4. The slight mis-alignment that occurs before the rods are cut into sections is not of moment, and any tendency to cause misplacement of the rods from the saddles is overcome by making the saddles slightly larger than the diameter of the rods. The knife 19 which is of larger diameter is beveled on both faces and as it cuts the rod in two, it pushes each half of the severed rod outwardly or sideways. Each of the other knives is beveled on its outer face so that as the sections are cut they are moved outwardly a distance equal to the thickness of the rotating knives. If the knives were of the same diameter, or if provision were not made to move the severed sections outwardly, the sections would tend to jam between adjacent knives.

After passing the knives, the filter tip sections 16 and 17 travel in the saddles to the discharge end of the machine. A shield 23 is arranged over this portion of the rolls to prevent the filter tip sections from becoming displaced from the saddles. At the outlet end they are delivered to a wrapping roll 24 of conventional construction, to be later described. The filter tip sections may be delivered to the wrapping roll by gravity, or mechanical means may be employed to insure their discharge from the saddles 9. In Fig. 1 I have indicated a set of parallel fingers 25 which extend into the grooves 109 provided in each of the saddles (see Fig. 2). As the saddle wheels rotate, the filter rod sections in an aligned row of saddles are simultaneously pushed down by the fixed fingers 25 and are thus discharged at the discharge end of the saddle wheel assembly.

The alternate rolls may be driven at the desired speeds in any suitable manner. As shown in Fig. 1, a chain 26 passes over a sprocket 27 on shaft 28. This shaft is driven by any suitable means in synchronism with other parts of the apparatus. Chain 26 passes over a sprocket 29 on a shaft 30. Gear 31 on this shaft is provided with 59 teeth. Gear 31 drives one of two 59 tooth gears 32 mounted on shaft 33 (see Fig. 2). Gears 32 mesh with two 59 tooth gears 34. These gears are keyed to sleeves 36 to which two of the faster moving rolls, in this instance, rolls 6 and 8, are keyed. A second gear 31 on shaft 30 meshes with one of two 60 tooth gears 37 mounted on shaft 38. These two gears mesh with 60 tooth gears 35 also mounted on sleeves 36. These sleeves are keyed to two of the slower traveling rolls, in this instance, rolls 5 and 7. The other rolls to the left in Fig. 2 may be similarly driven, and the drive means has not been duplicated on the drawing. One of the faster driven rolls, illustrated as roll 4, may be keyed to a central shaft 133 which is driven by a 59 tooth gear 134, similar to the gears 34.

As stated, the inner filter rods 13 are of eight sections in length and the outer rods 14 of six sections. This produces aligned rows of seven filter rod sections at the outlet end of the machine, one row containing a blank at wheel 1 and the next row a blank at wheel 8, and each assembly consisting of 4 inner sections 16, and 3 outer sections 17. The manner in which this occurs is apparent. If we take the four sets of saddles represented by positions 1 to 4 in Fig. 4, the inner sections 16 of wheels 2, 4, 6 and 8 at position 2 will move ahead of the inner sections in the saddles of rolls 1, 3, 5 and 7. At the outlet end, saddles of wheels 2, 4, 6 and 8 that were in position 2 will have overtaken the saddles of the slower rolls that were in position 3. That produces an assembly, such as shown at position 60—61, with 7 sections in the saddles of rolls 2 to 8 and with an inner section 16 at each end. Likewise, the faster movement will bring the saddles of rolls 2, 4 and 6 of position 3 into alignment with the saddles from position 4 of rolls 1, 3, 5 and 7. That produces an assembly such as is shown at position 59—61 with 7 sections in the saddles of rolls 1 to 7, and with an inner section at each end. This alignment of alternate filter rod sections is repeated as the rolls are rotated.

The wrapper machine of conventional construction, consists of a pair of end discs 40 mounted on a shaft 41 and rotating in a clockwise direction. A plurality of rolls 42, arranged at the periphery of the discs, are slightly spaced from each other. Similar rolls 43 are arranged between the pairs of rolls 42, on the inner side. This forms a cradle between each pair of rolls into which the assembly 44 of filter sections is delivered from the saddles 9 at the outlet end of the rolls. The rolls 42 and 43 are not driven but are free to rotate on their own axes. As the discs 40 revolve to move the assemblies 44 from the top to the bottom of the wrapping roll, the assemblies are held in the cradles by a shield 45. It will be noted that as the assemblies of filter sections are delivered to the wrapping roll, the alternate assemblies are out of alignment (see positions 61—60 and 60—59 of Fig. 4). Suitable guide strips (not shown) may be secured to or extend through shield 45 to align the assemblies while they are in the cradles of the wrapping roll.

Under the wrapper roll is a ledger roll 46 on which paper sections 47 are cut of a length slightly greater than the circumference of the assembly 44. As shown, paper 48 of a width equal to the length of the assembly 44 is delivered from a reel or bobbin 49. The paper is fed between a pair of driven pinch rolls 50. Paste is applied to one side of the paper by a suitable paste-applying mechanism 51. The paper is then fed to the ledger roll. Over a portion 52' of the ledger roll extending from the point of feed of the paper to a point where it contacts with the wrapping roll, the interior of the ledger roll is provided with suitable suction means. The surface of the roll is provided with openings 52 (see Fig. 3) to cause the paper to adhere to the roll and be carried forward by it. A rotating cutter 53 is timed to cut the sections 47 of the proper length. The ledger roll 46 rotates at a higher peripheral speed than the feed rolls 50, which enables the sections 47 to be cut with a clean edge and move away from the leading edge of paper 48. As the paper sections 47 come in line with the assemblies 44, a pressure chamber 54 in the ledger roll blows the paper section against the assembly of filter rod sections. At the same time, the rolls 42 are rotated on their axes to wrap the paper around the assembly. As shown (Fig. 3) ledger roll 46 has sections 55 of rubber at each end and these sections are of slightly greater diameter than the rest of the rolls. They engage the rolls 42 to rotate them and cause the filter tip assemblies in the cradles to be rotated. As the assemblies rotate, the paper sections 47 are blown against them by the pressure from chamber 54. The paper wraps around them and is sealed by the paste on its surface.

The wrapped filter tip assemblies continue in the cradles of the wrapping roll beneath a shield 56 which prevents their displacement. Beyond the shield, they are passed to a transfer roll 57. This roll has a plurality of pockets 58 for the reception of the wrapped assemblies. As shown, the wrapped assemblies pass under a set of circular knives 59, somewhat similar to knives 19 to 22, whereby they are cut into appropriate sections. These sections remain in pockets 58 being prevented from becoming displaced by a shield 60. At the end of the shield they pass over a plate 61 to conveyor 62.

Fig. 8 illustrates the manner in which the filter assemblies are cut. The assembly consists of four inner sections 16 and three outer sections 17. One-half of the inner section 16 at each end of the assembly is cut off, as indicated at 65. The two half inner sections may be discarded or salvaged. This leaves an assembly with a half filter section 16 at each end, three sections 17 and two sections 16 between them. The rod is then cut in the middle of each of the two sections 16, as indicated at 66. This produces three filter rod sections, each consisting of a half inner section at each end and a full length outer section between them. These sections are then assembled on a conventional cigarette machine, with a cigarette at each end and next to the half inner section of the filter tip. Such assembly is then cut at the middle of the outer filter tip section 17, forming two cigarettes each with a filter tip of an inner half section 16 and an outer half section 17.

Figure 5:
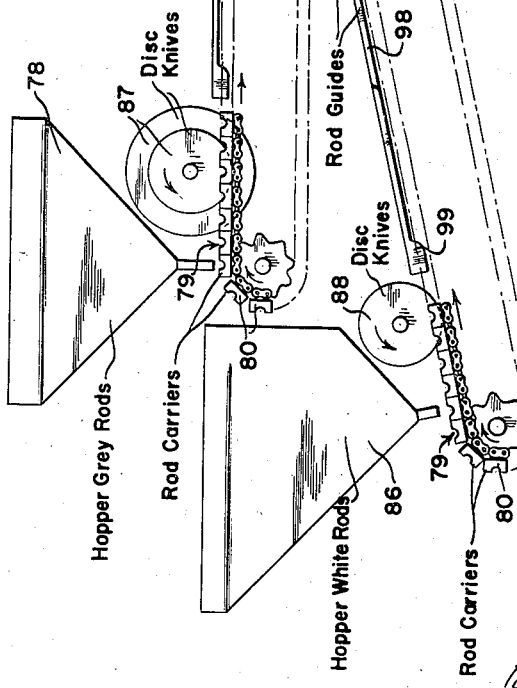
Fig. 5 is a side elevation of apparatus employed in an alternative form of the invention.
Figure 6:
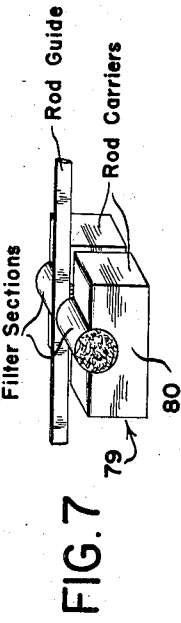
Fig. 6 is a plan view of the belts of Fig. 5.
Figure 7:
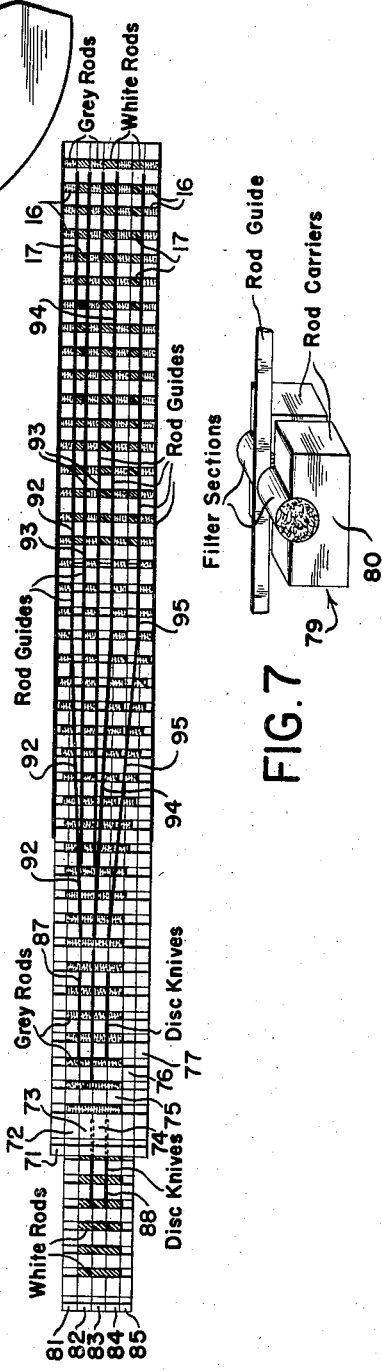
Fig. 7 is a detailed view of a pair of saddles.

In the form of the invention shown in Figs. 5 to 7 of the drawings I employ belts in place of the rolls, but the principle of operation is substantially the same. As shown, I provide one set of seven belts 71 to 77. Rods of the inner filter sections 16 are fed to these belts from a hopper 78. The rods are received in saddles 79 which may consist of blocks 80 having semi-circular recesses in their upper faces for the reception of the filter rods. A second set of five belts 81 to 85 is arranged adjacent the first set of belts with the five belts of the second set in vertical alignment with the second to sixth belts of the first set. Rods of the outer filter sections 17 are fed to these belts from a hopper 86, the belts being provided with saddles 79 as heretofore described.

In using this form of apparatus the rods in hopper 78 are of a length equal to that of four filter section lengths and the rods in hopper 86 of three filter section lengths. All of the belts travel at the same speed. The plugs are delivered to the saddles and cut into filter rod sections 16 and 17. The cutting operations are performed by knives 87 and 88 generally similar to the knives heretofore described in connection with the form of the invention shown in Figs. 1 to 4. Belts 71, 73, 75 and 77 of the first set travel to the outlet end of the machine and pass over sprockets 89 on shaft 89'. Belts 72, 74 and 76 do not travel the full distance but pass around sprockets 90 on a shaft 91 at an intermediate point. The rods are delivered to be received in the saddles of any four belts, illustrated in Fig. 6 as the saddles of belts 72 to 75. After they are cut into filter rod sections 16, they must, however, be arranged in the saddles of belts 71, 73, 75 and 77 to assure their delivery to the outlet end of the machine. This is accomplished by guides arranged above the path of the belts and adapted to engage the portion of a filter section extending above the semi-circular recess in the saddle (Fig. 7). Thus, guide strip 92 engages the inner edge of a rod section on belt 72 and moves it laterally into the saddle of belt 71. The section in the saddle of belt 73 is not moved, but guides 93 on each side of this belt prevent displacement of the filter section. Rod sections in saddles of belt 74 are moved laterally into the saddles of belt 75 by a guide 94, and sections in saddles of belt 75 are moved laterally by guide 95 into the saddles of belt 77. As shown, these guides consist of metal strips arranged vertically to engage the appropriate ends of the filter rod sections, and extend across the belts in inclined sections to deliver the filter rod sections to the proper belts. They may extend to the outlet end of the machine, as shown in Fig. 6, to prevent displacement of the filter rod sections after they have been arranged on the proper belts.

In the second set of five belts, three belts travel to the outlet end of the machine and pass over sprockets 89 on shaft 89'. These are the belts in the same vertical planes as belts 72, 74 and 76 or belts 81, 83 and 85. Belts 82 and 84 pass over sprockets 96 on shaft 97 at an intermediate point. Filter rods are delivered from hopper 86 to a set of saddles on three of the belts, illustrated as belts 82, 83, 84. After the filter rod is cut into three filter rod sections by the knives 88, guides 98 and 99 move the filter rod sections 17 from belt 82 to belt 81 and belt 84 to belt 85, respectively. The filter rod section on belt 83 is not moved as this belt goes to the outlet end of the machine. After the belts 81, 83 and 85 pass the sprockets 96, guides 100 may be provided to prevent displacement of the filter rod sections. Thus belts 81, 83 and 85 deliver outer filter rod sections 17 alternately positioned between inner filter rod sections 16 on belts 71, 73, 75 and 77 at the outlet end of the machine. The assemblies, similar to those delivered at the outlet of wheels 1 to 7 in the other form of the invention, are fed to the cradles of the wrapping roll 24 and are handled from that point in the manner heretofore described.

The guides referred to in connection with the wrapping roll and not illustrated may consist of strips similar to the guides described in connection with Figs. 5 and 6. They may extend across the surface of the roll, through shield 45 to engage the ends of the assemblies and shift them laterally. Or similar guides may be employed with shield 56 to align the assemblies just prior to reaching the knives 59.

I claim:

1. The method of making laminated cigarette filters for cigarettes which comprises delivering filter rods of multiple filter length to carriers on one set of moving members, delivering filter rods of a different type of multiple filter length to carriers on a second set of moving members, cutting the rods while in said carriers to desired length to provide in each set of moving members a plurality of filter sections arranged in the carriers and extending transversely of the moving members, causing two sets of carriers, one on each set of moving members, to reach a discharge point with the filter sections arranged alternately transversely of the moving members, and discharging the alternately arranged filter sections from the moving members.

2. The process of making laminated filters for cigarettes which comprises alternately delivering filter rods of multiple filter length and of different types to carriers on a plurality of moving members, the alternate moving members forming two sets traveling at different speeds, cutting the rods into filter sections while in the carriers, the speed of the moving members being correlated so that the faster set will cause a row of carriers to overtake the preceding row of carriers of the slower set between the delivery point and the discharge to provide a row of alternately arranged filter sections at the discharge end, and discharging the alternately arranged filter sections.

3. The process of making laminated filters for cigarettes which comprises delivering filter rods of one type to carriers on a set of moving members, cutting the rods into filter sections, arranging the sections on carriers of alternate ones of the moving members, causing the moving members with the carriers containing the filter sections to travel to a discharge point, causing the remaining carriers to return to the delivery point at an intermediate point in the path of travel, delivering filter rods of a different type to a second set of carriers mounted on a second set of movable members, cutting the second rods into filter sections, arranging the sections on carriers of alternate ones of the moving members, the alternate moving members of the second set on which the filter sections are arranged being in vertical alignment with the moving members of the first set which are returned to the delivery point from an intermediate point, causing the remaining moving members of the second set to return to the delivery point from an intermediate point, and causing the moving members of the second set with the carriers in which the filter sections are arranged to travel to the discharge point to provide alternate carriers at the discharge point containing filter sections of the two types.

4. The method of making laminated cigarette filters which comprises delivering mouth-piece elements of multiple lengths to carriers on moving members, delivering mouth-piece elements of multiple lengths of a different type to other carriers on the moving members, cutting the elements into sections, arranging a set of sections of one type in carriers of moving members spaced from each other, arranging a set of sections of the other type in carriers of the moving members spaced from each other with the carriers containing the sections of each type in alignment with the spaces in the sets of sections of the other type, and causing sets of carriers containing two sets of sections of different types to reach a discharge point at the same time to deliver an assembly consisting of alternate sections of each type.

5. Apparatus of the character described comprising a plurality of moving members, saddles on the moving members for receiving and holding mouth-piece elements of multiple lengths, means for delivering mouth-piece elements of two different types to sets of saddles, means for dividing said elements into sections in the carriers, means for causing saddles of alternate moving members containing sections of one type to reach a discharge point, means for causing saddles of alternate moving members containing sections of the other type to reach the discharge point at the same time as the first set of saddles whereby an assembly of sections of the two types in alternate arrangement is delivered at the discharge point.

6. The method of making laminated cigarette filters which comprises delivering filter rods of multiple filter length to alternate, transversely aligned carriers on a set of rolls, delivering filter rods of a different type of multiple filter length to alternate, transversely aligned carriers on said rolls, cutting the rods into filter sections while in said carriers, causing alternate ones of said rolls to travel at a certain speed, causing the other alternate rolls to travel at a second speed, the speed of the two sets of rolls being so correlated that a set of carriers of the faster traveling rolls will overtake and become aligned with the preceding sets of carriers of the slower traveling rolls at the discharge point to provide filter sections of the two types arranged alternately transversely of the moving members in the carriers at the discharge point, and discharging the alternately arranged filter sections from the rolls.

7. Apparatus for forming laminated filter tips comprising a plurality of concentrically mounted rolls, means for rotating alternate rolls comprising one set at a given speed, means for rotating the other alternate rolls comprising a second set at a different speed from the first set, saddles formed in the peripheries of the rolls for the reception of filter rods, means for delivering filter rods of two different types to alternate sets of transversely aligned saddles at an inlet point, and means for dividing the filter rods in the saddles into filter sections, the speed of the second set of rolls being correlated to that of the first set to cause a row of saddles of the second set to overtake the preceding row of saddles of the first set at a discharge point to transversely align an assembly of filter sections consisting of alternate sections of the two types.

8. Apparatus for forming laminated filter tips comprising a plurality of moving members traveling in parallel paths, means for moving alternate members constituting a first set at one speed, means for moving the remaining alternate members at a second speed, spaced carriers on each set of moving members, the carriers on each set of moving members being transversely aligned with the other carriers on said set and equally spaced from each other, means for driving the moving members at such speeds that a set of carriers on each set will be transversely aligned with a set of carriers of the other set at an inlet point, the speed of the moving members being such that a transversely aligned set of carriers of the faster driven moving members will overtake and become transversely aligned with a set of carriers of the slower driven moving members at a discharge point, and means for dividing the filter rods into filter sections between the inlet point and the discharge point.

9. Apparatus of the character described comprising a set of moving members, carriers arranged on said moving members, the carriers being equally spaced from each other and being transversely aligned with carriers on the other members of the set of moving members, means for delivering filter rods to the moving members at an inlet point, the filter rods being of greater length than the width of the moving members and being positioned in a plurality of carriers, means for cutting the filter rods into sections, means for moving the filter sections transversely from the carriers of one moving member to carriers of adjacent moving members to arrange the filter sections in carriers of alternate ones of the moving members, the moving members with the carriers in which the sections are arranged traveling to a discharge point, means for returning the remaining carriers to the inlet point from an intermediate point in the path of travel, a second set of moving members, carriers on the second set of moving members, said carriers also being equally spaced from each other and transversely aligned with carriers of the other moving members of the second set, means for delivering filter rods of a different type to the moving members of the second set at an inlet point, said filter rods also being of greater length than the width of the moving members and carriers and being positioned in a plurality of carriers, means for cutting the filter rods into sections, means for moving the filter sections transversely from the carriers of one moving member to carriers of adjacent moving members to arrange the filter sections in carriers of alternate ones of the moving members, the carriers of the second set of moving members in which the filter sections are arranged being aligned with the alternate carriers of the first set, the alternate moving members of the second set of moving members being returned to their inlet point, and means for causing the sets of carriers of the second set in which the filter sections are arranged to reach the discharge point in transverse alignment with sets of carriers of the first set of moving members to deliver an assembly of a plurality of alternately arranged filter sections.

10. The method of claim 6 in which the filter rods are delivered to the carriers of the rolls at one point in their path of revolution and discharged therefrom at a point substantially 180° from the point of delivery.

11. Apparatus in accordance with claim 5 in which the moving members consist of a set of parallel endless belts.

12. Apparatus in accordance with claim 9 in which the moving members of each set which return from an intermediate path pass over sprockets on shafts, and in which the moving members carrying the filter sections to the discharge point pass over sprockets on a single shaft.

13. Apparatus in accordance with claim 5 in which the moving members consist of concentric discs and the carriers are on the peripheries of the discs.

14. Apparatus in accordance with claim 13 in which means are provided to deliver filter rods to the carriers at one point in the path of revolution of the discs, and means are provided for removing the assemblies of filter sections from the pockets at a point substantially 180° from the point of delivery.

15. Apparatus in accordance with claim 13 in which the means for dividing the filter rods into filter sections consists of a plurality of concentric disc knives, the center knife being of greater diameter to cut the rods in two parts before the other knives contact with the filter rods and the remaining knives consisting of discs arranged in pairs, one on each side of the center knife, spaced from each other a distance equal to the length of the filter section, each pair of discs being of smaller diameter than the next inner pair of discs whereby the filter sections are cut from the two halves of the filter rod in succession as the discs travel past the disc knives.

16. Apparatus in accordance with claim 8 in which the moving members consist of concentric discs and the carriers are on the peripheries of the discs.

17. Apparatus in accordance with claim 16 in which the means for dividing the filter rods into filter sections consists of a plurality of concentric disc knives, the center knife being of greater diameter to cut the rods in two parts before the other knives contact with the filter rods and the remaining knives consisting of discs arranged in pairs, one on each side of the center knife, spaced from each other a distance equal to the length of the filter section, each pair of discs being of smaller diameter than the next inner pair of discs whereby the filter sections are cut from the two halves of the filter rod in succession as the discs travel past the disc knives.

18. Apparatus in accordance with claim 5 wherein the means for cutting the mouth-piece elements into sections consists of a plurality of disc knives, said knives being arranged in pairs on each side of the center, each pair of knives being of smaller diameter than the adjacent inner knives, the knives being equally spaced from adjacent knives a distance equal to the length of a section.

19. The method of making laminated filters which comprises placing filter sections of one type in aligned rows of carriers of moving members, placing filter sections of another type in aligned rows of moving members, the alternate moving members forming two sets traveling at different speeds, causing the alternate carriers that travel at a higher speed to reach a discharge point at the same time as a slow moving set of carriers which contains the other type of filter sections, and discharging the aligned, alternately arranged filter sections of the two types.

20. The process of making laminated filters for cigarettes which comprises alternately arranging filter sections of one type and filter sections of another type in carriers on a plurality of moving members, the alternate moving members forming two sets traveling at different speeds, the speed of the moving members being correlated so that the faster set will cause a row of carriers to overtake the preceding row of carriers of the slower set between the delivery point and the discharge to provide a row of alternately arranged filter sections at the discharge end, and discharging the alternately arranged filter sections.

21. The method of making laminated filters for cigarettes which comprises arranging a plurality of filter sections of one type in transversely aligned carriers on a plurality of moving members, the alternate moving members forming two sets traveling at different speeds to cause the filter sections to arrive at a discharge point in two sets spaced from each other transversely of the moving members, arranging a plurality of filter sections of a different type in transversely aligned carriers on a plurality of moving members, the alternate moving members forming two sets traveling at different speeds to cause the filter sections to arrive at a discharge point in two sets spaced from each other, the delivery of the filter sections being correlated to place the spaces in each delivered set of sections of one type in alignment with sections of the other type, and wrapping the aligned sections to form a laminated filter rod.

22. The method of making laminated filters which comprises placing filter sections of one type in aligned rows of carriers of moving members at a loading point; placing filter sections of another type in alternate rows of carriers of the moving members, causing alternate moving members to travel in such manner that a row of carriers of said moving members will overtake and become aligned with the preceding set of carriers of the other moving members at a discharge point, and discharging the thus aligned filter sections from the moving members.

23. Apparatus of the character described comprising a plurality of parallel moving members, a plurality of equally spaced saddles on the moving members for reception of filter tip sections, means for delivering filter tip sections of one type to a transverse row of saddles on said moving members aligned at a loading point, means for delivering filter tip sections of a different type to the next row of transversely aligned saddles on the moving members, means for causing alternate moving members to reach a discharge point with a row of saddles of said alternate moving members aligned with the preceding row of saddles of the other moving members, and means for discharging the filter tip sections at the discharge point.

References Cited in the file of this patent

UNITED STATES PATENTS

| | | |
|---|---|---|
| 2,445,488 | Luteran | July 20, 1948 |
| 2,716,449 | Larsen | Aug. 30, 1955 |